United States Patent
Maddalozzo, Jr. et al.

[11] Patent Number: 5,974,460
[45] Date of Patent: Oct. 26, 1999

[54] APPARATUS AND METHOD FOR SELECTING AN OPTIMUM TELECOMMUNICATIONS LINK

[75] Inventors: John Maddalozzo, Jr.; Gerald Francis McBrearty; Johnny Meng-Han Shieh, all of Austin, Tex.

[73] Assignee: International Business Machines Corporation, Armonk, N.Y.

[21] Appl. No.: 08/876,413

[22] Filed: Jun. 16, 1997

[51] Int. Cl.⁶ ...................................................... G06F 13/14
[52] U.S. Cl. .......................... 709/224; 709/227; 709/219
[58] Field of Search .................... 370/231, 232, 370/235, 237; 395/651, 200.68, 200.72, 200.3, 200.33, 200.54; 709/200, 203, 224, 242, 238, 227, 225

[56] References Cited

U.S. PATENT DOCUMENTS

| | | | |
|---|---|---|---|
| 3,775,751 | 11/1973 | Anderson | 340/172.5 |
| 4,736,363 | 4/1988 | Aubin et al. | 370/60 |
| 4,905,171 | 2/1990 | Kiel et al. | 364/551.01 |
| 4,931,924 | 6/1990 | Kageura | 364/200 |
| 5,088,032 | 2/1992 | Bosack | 395/200 |
| 5,341,477 | 8/1994 | Pitkin et al. | 395/200 |
| 5,432,932 | 7/1995 | Chen et al. | 395/650 |
| 5,459,837 | 10/1995 | Caccavale | 395/184.01 |
| 5,491,690 | 2/1996 | Alfonsi et al. | 370/60 |
| 5,521,910 | 5/1996 | Matthews | 370/54 |
| 5,600,638 | 2/1997 | Bertin et al. | 370/351 |
| 5,687,167 | 11/1997 | Bertin et al. | 370/254 |
| 5,740,371 | 4/1998 | Wallis | 395/200.59 |
| 5,754,543 | 5/1998 | Seid | 370/351 |
| 5,774,660 | 6/1998 | Brendel et al. | 395/200.31 |
| 5,781,449 | 7/1998 | Rosborough | 364/514 R |
| 5,838,919 | 11/1998 | Schwaller et al. | 395/200.54 |

*Primary Examiner*—Mark H. Rinehart
*Assistant Examiner*—Marc D Thompson
*Attorney, Agent, or Firm*—Robert V. Wilder; Leslie A. Van Leeuwen

[57] ABSTRACT

A method 401 and implementing system 101 are provided in which a site selection program is operable to selectively initiate sample data transfers from a plurality of mirror sites 313 on the Internet, and to make a determination, prior to a selection of a site to be contacted for a download, as to which of the sites exhibits the best transfer rates at the time of the site selection. The methodology includes a cut-off time 507 process for terminating a sample operation of any one site if the transfer time for a predetermined number of bytes "X" exceeds a predetermined maximum amount of time "Y" for the sample operation for any particular site. When the maximum time is exceeded, the program stores the number of bytes transferred during that time for comparison with other site data. After all sites have been sampled, the program determines a selected site which exhibits the best rate of data transfer, and selectively initiates the establishment of a communication link with the selected site.

24 Claims, 4 Drawing Sheets

APPARATUS AND METHOD FOR SELECTING AN OPTIMUM TELECOMMUNICATIONS LINK

FIELD OF THE INVENTION

The present invention relates generally to information processing systems and more particularly to an improved methodology for selecting the most efficient telecommunications link of a plurality of available links.

BACKGROUND OF THE INVENTION

As computer systems and networked computer systems proliferate, information access time becomes more critical. For many reasons, access time to information databases has a tendency to increase even with frequent equipment upgrades and technology advances. This tendency is apparent in mostly all database accesses which involve telecommunications links and is especially visible to the growing number of users of the Internet and worldwide web applications where extensive graphics are implemented.

In most cases, a user has no informed control over the telecommunications link chosen to access sites on the Internet or "net". Most Internet applications provide a user a plurality of selections for accomplishing a "search" for specific information in which a user may be interested. In those cases, the access speed may depend upon the search engine program design and also upon the telecommunications link and the data path selected. Once a user selects a search engine and then later selects a data path, if the data is coming in at too slow of a rate, the only course of action available to the user would be to stop the transaction and begin again using another selected engine or data path.

In other applications, a link screen is provided for the user to select one or a plurality of "web sites" where each web site is a so-called "mirror site", i.e. one of several listed sites which contain copies of the same information which is sought by the user. Each site may be served by the same server or a different server in the same room or a different server in another city or even in another country. The access times to any of the servers would also depend on a number of factors including the number of users logged on to the access page or using the telecommunications link at any given time.

Thus, the fastest link at a given access time for one user may be the slowest link several minutes later for another user who may be attempting to use the same link. In some cases, access to mirror sites in foreign countries will provide faster access and data transfer time than corresponding sites in the same neighborhood as a user. Thus, a user may have successfully used a link or site on one day with great success and satisfaction but, later in the day, a subsequent use of the same link or site will not provide satisfactory results. In that case the user's only recourse to speed-up the transaction is to stop the current transaction and retry the access using a different mirror site selection. Unfortunately, that solution is not satisfactory either since much transaction time is lost in re-logging and engine start-up routines in addition to the time lost in waiting for results to return from the first site selection.

Accordingly, there is a need for an enhanced method and processing apparatus which is effective to determine the most efficient of several available telecommunication links from a user site to remotely accessed databases or information sites based upon real time transmission criteria sampling.

SUMMARY OF THE INVENTION

A method and apparatus is provided in which a site selection program is operable to selectively initiate sample data transfers from a plurality of mirror sites on the Internet, and make a determination prior to a selection of a site to be contacted for a download, as to which of the sites exhibits the best transfer rates at the time of the site selection. In a preferred embodiment, the methodology includes a cut-off time for terminating a sample operation of any one site if the transfer time for a predetermined number of bytes exceeds a predetermined maximum amount of time for the sample operation for any particular site. When the maximum time is exceeded, the program stores the number of bytes transferred during that time for comparison with other site data. The program selectively displays the results of the selection methodology and/or automatically selects and initiates a communication link to the selected site.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
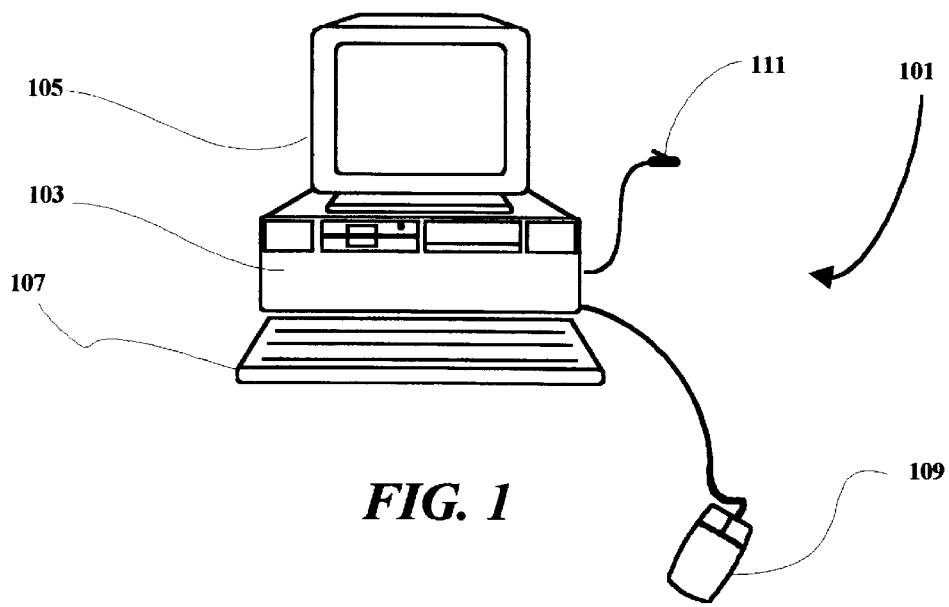
FIG. 1 is a diagram of a computer system in which the present invention may be implemented.

With reference to FIG. 1, the various methods discussed herein may be implemented within a typical computer system 101 which may include a workstation or personal computer. In general, an implementing computer system may include a plurality of processors in a multi-bus system in a network of similar systems. However, since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated, for the understanding and appreciation of the underlying concepts of the present invention and in order not to obfuscate or distract from the teachings of the present invention.

In FIG. 1, the computer system includes a processor unit 103 which is typically arranged for housing a processor circuit along with other component devices and subsystems of the computer system 101. The computer system 101 also includes a monitor unit 105, a keyboard 107 and a mouse or pointing device 109, which are all interconnected with the computer system illustrated. Also shown is a connector 111 which is arranged for connecting a modem within the computer system to a communication line such as a telephone line in the present example. The present invention may also be implemented in a cellular system in which case the connector 111 would not be required.

Figure 2:
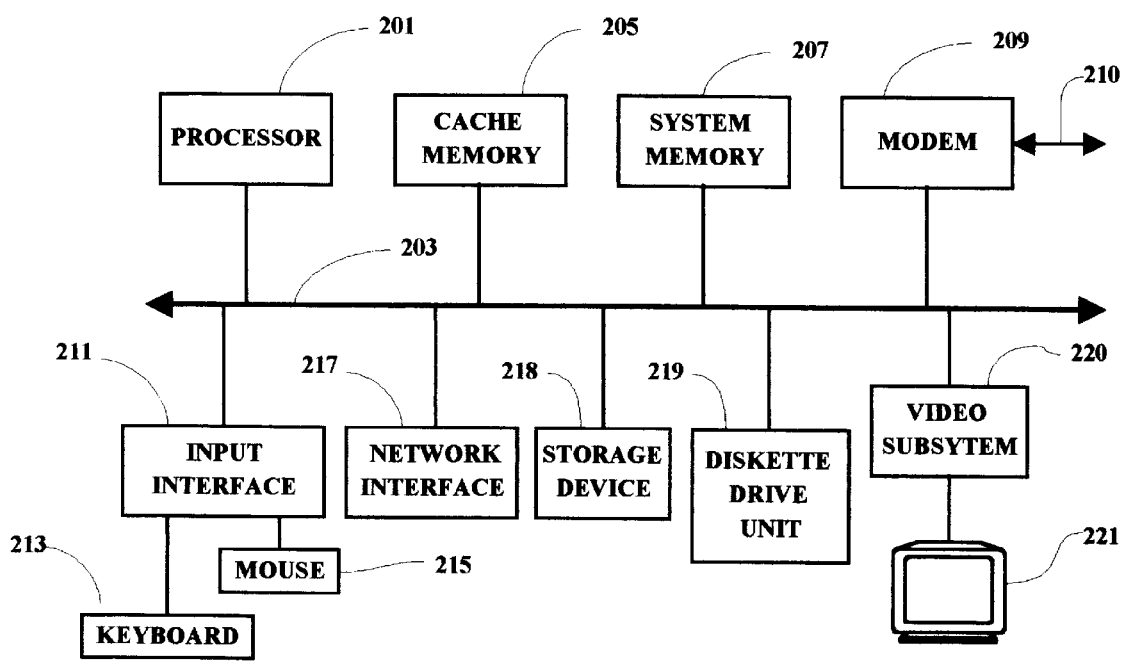
FIG. 2 is a simplified schematic diagram showing selected components and subsystems of the computer system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a network interface subsystem 217 and a diskette drive unit 219. A video subsystem 220, which may include a graphics subsystem, is connected to a display device 221. A storage device 218, which may comprise a hard drive unit, is also coupled to the bus 203. The diskette drive unit provides a means by which individual diskette programs may be loaded on to the hard drive, or accessed directly, for selective execution by the computer system 101. As is well known, program diskettes containing application programs represented by magnetic indicia on the diskette, may be read from the diskette drive, and the computer system is selectively operable to read such magnetic indicia and create program signals. Such program signals are selectively effective to cause the computer system to present displays on the screen of a display device and respond to user inputs in accordance with the functional flow of the application program on the diskette.

In running an Internet access program or browser program on the computer system 101, the access program is typically stored in the storage device 218 and either selectively or automatically, partially or totally, loaded into the system memory 207 when the system is initially powered-on, or at a later time if so desired by a user. The browser is selectively operable to access and execute a site selection program, as herein described, either directly from a diskette in the diskette drive unit 219 or directly from a copy of the site selection program stored on the hard drive unit 218. As a program is running, either a portion of the program or the entire program may be loaded into the system memory 207 and/or the system cache memory 205. Depending on specific program design, the system may store any information accessed from a database in the storage unit 218, the cache memory 205, the system memory 207 or directly from a diskette loaded into the diskette drive 219. Assuming a user has started-up the system, and is actively running an Internet program from memory, a series of screens will be displayed to the user on the display device 221. Each screen typically has one or more selections for the user to make in navigating through the program. In general, a user will make selections from a display screen using the keyboard 213 or the mouse or pointer device 215. In an Internet operating program, the selections made by the user will determine "where" the user "goes", i.e. to what "site", and also, in some cases, the communications link or the path taken to get to the site selected.

Figure 3:
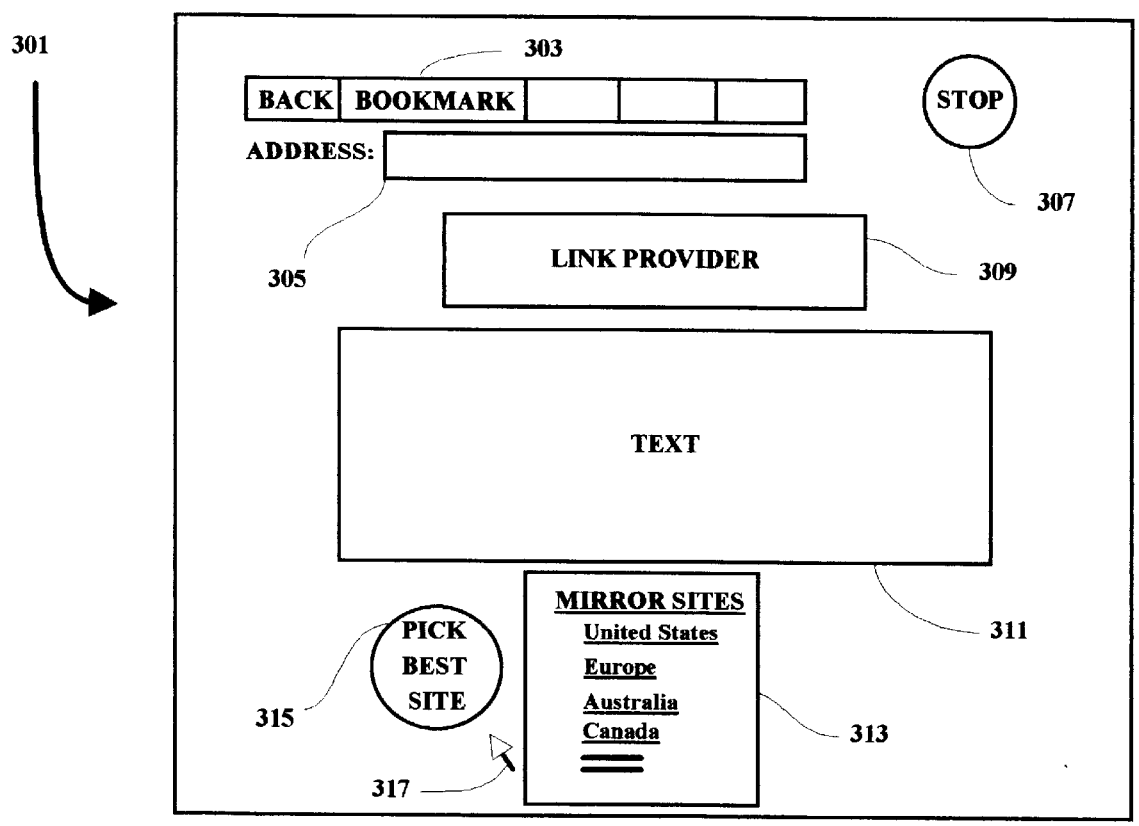
FIG. 3 is an illustration of an exemplary display screen for reference in explaining the present invention.

FIG. 3 illustrates a typical program screen display 301 in an Internet operating session. The screen generally includes a row or group of operating tools 303 from which a user may select by pointing the pointer 317 using the mouse device 215, for example. The screen also shows an address block 305 and a "STOP" button 307. The STOP button may be selected and invoked if the user wishes to terminate or stop a transmission of data from another computer or server. In many cases, a user will request a data transfer or to go to a selected site by typing in an address 305, but as the requested transaction is processing, the user sees that it is taking too much time. In that case the user may, using the mouse 215, "point and click" on the STOP button 307, and the program will stop the transmission and return the user to the previous screen to make another selection. In that case, the user will lose the time already invested in the initial site selection, as well as the transfer time and the time it takes to renew the previous screen in order to make another selection. Even after the user makes another selection of a site to visit or a link for going there, there is no guarantee that the second choice will be any faster than the first choice.

The display screen illustrated in FIG. 3 also typically includes the identity of a "LINK PROVIDER" 309 and a text section 311 for displaying selected text information and other material to a user. Near the bottom of the screen 301 in the present example, is a "site listing" section 313 which displays a plurality of "mirror sites" available for selection by the user in "going to" or linking-up with a site which has the information desired by the user. As illustrated, there are typically a plurality of such mirror sites and the user is free to select any one of the identified sites to link-up with that site to access the desired information. However, as hereinbefore explained, there is generally no indication of which site would provide the most efficient and fastest data path for the user to select. As hereinbefore noted, the fastest and most efficient of the sites displayed may change from moment to moment depending upon many factors including the number of users that are presently logged in to the site at any given time. In some cases, it will be a more efficient site to access the desired page with the "Europe" page rather than the "United States" selection. Heretofore, a user had no way of knowing which site would be the most efficient on a real time basis.

In accordance with the present invention, a "PICK BEST SITE" button 315 is provided in the present example, which the user may invoke with the pointer 317 prior to selecting any of the listed "mirror sites", in order to determine which link or site will be the most efficient at the time the user is requesting the data transaction. Following the methodology executed by invoking the PICK BEST SITE operation, the program may either display the site determined to be "best", or automatically execute the requested transaction using the program-selected site, or both.

Figure 4:
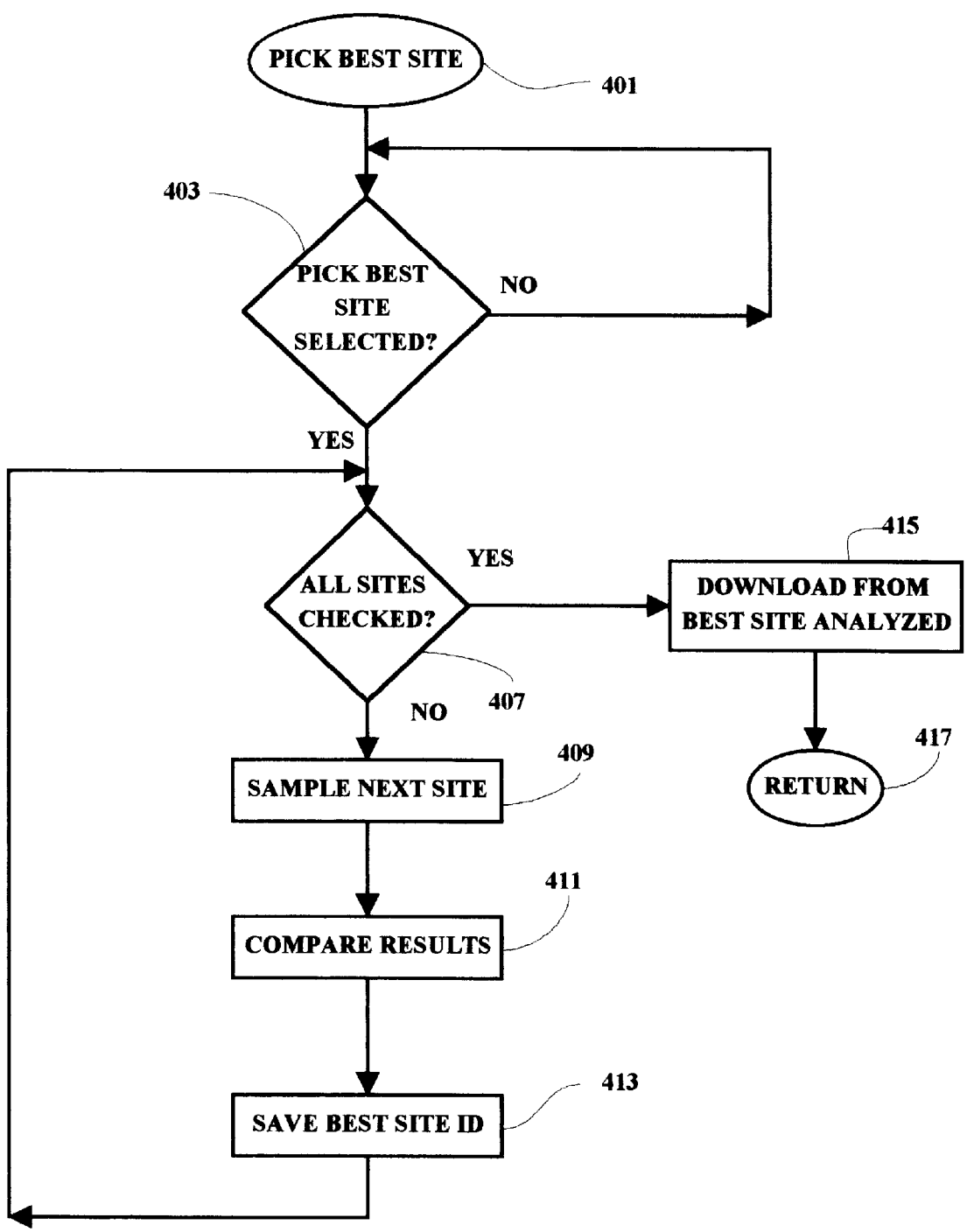
FIG. 4 is a flow chart illustrating a sequence of operations as implemented in the exemplary embodiment.

FIG. 4 is a flow chart illustrating an exemplary operational routine used in implementing the present invention. When the PICK BEST SITE button 315 on the display screen 301 has been selected 403 and activated with the pointer device 109 for example, the PICK BEST SITE methodology 401 is invoked and a determination is made 407 as to whether all of the sites have been checked. On the initial pass, all of the sites listed 313 have not been checked and the program proceeds to sample the next site 409. The process may be set-up to check the sites in any order including the order they are listed in the screen selection box 313. The methodology continues after sampling the response of one of the listed sites, to compare 411 the response received with other responses received from prior samples. In general, the program is designed to receive a small sample of "X" bytes from the site being checked.

The value of "X" would be chosen to be sufficient to provide a fair indication of the transfer time using the particular site being checked, but not so large as to unduly slow down the selection process. In the event the transfer of the sample bytes takes more time than a predetermined threshold time "Y", then the process will switch over to a "Bytes transferred per unit time" mode for that particular site (rather than the default "Time taken for X Byte transfer" criterion) for purposes of determining the most efficient site.

After the time taken for X Bytes to transfer, or the number of bytes transferred in Y time, for the site being check has been compared 411 to the other sites that had been checked previously, the program "remembers" or stores the identification of the best or most efficient site 413, and returns to determine if all of the sites have been checked 407, and if not, then the next site is sampled 409. After all of the sites have been sampled 409 and compared 411 and the program has stored the best or most efficient site identification 413, then the program can either display the best site, or automatically download from the best site 415 as is illustrated in the present example, or both. The program may then display the information acquired from the selected site, or return 417 to a predetermined point in the Internet program as appropriate. If the downloaded information is an updated version of a program from the selected site for example, the user's program may merely indicate that the program has been updated and return the user to a main menu screen.

Figure 5:
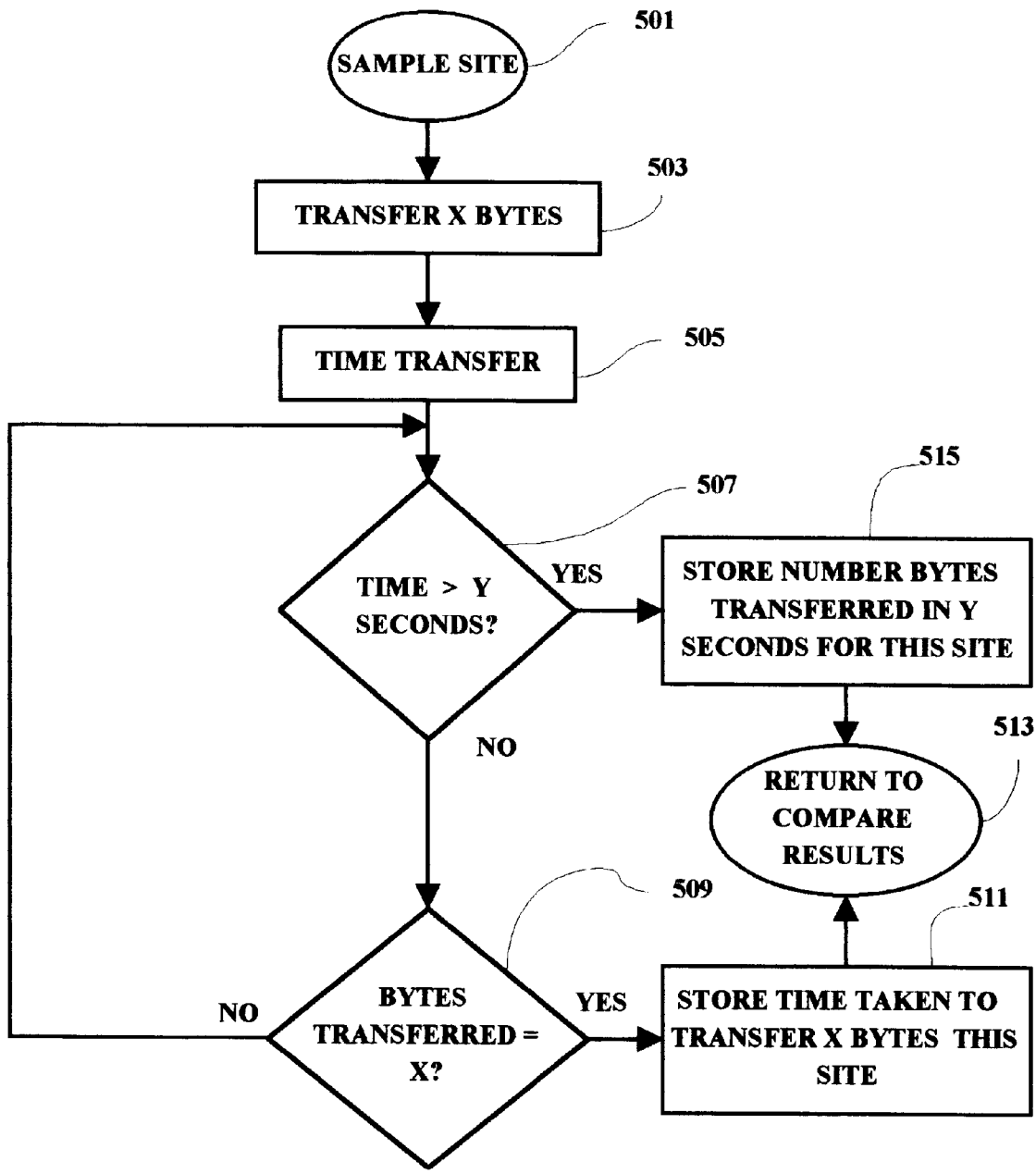
FIG. 5 is a flow chart illustrating the details of one segment of the flow chart shown in FIG. 4.

In FIG. 5, an exemplary implementation of the sample function 409 is illustrated. When the "Sample Site" function is invoked 501, the program begins to transfer "X" bytes 503 from the site being checked. At that time the program starts a timer to time the transfer 505. So long as the time taken to transfer X bytes is less than a predetermined value "Y" 507, the process will continue to monitor the transfer process until the number of bytes that have been transferred is equal to the predetermined sample amount "X" 509. At that time, the time taken to transfer the X bytes from the site being sampled is stored 511, and the process returns 513 to compare the results 411 with the results from other sites. When the transfer time exceeds a predetermined threshold transfer time "Y" 507, then the transfer process is cut short at the predetermined time "Y" and the number of bytes transferred during that time is "remembered" or stored 515 (usually in system memory 207 or cache memory 205), and the process continues to compare 411 the results with the best site results from earlier samples. Typically, the best "Time Taken For X Bytes" results are of a faster category than the "Bytes Transferred in Y Time" results, and will have a priority in the comparison process.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The monitoring methodology may also be implemented solely in program code stored on a disk or diskette (portable or fixed), or other memory device, from which it may be executed to monitor and/or report system resource conditions as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for selecting a best mirror site of a plurality of mirror sites available to a user of a computer system, wherein each of said mirror sites contains predetermined information sought to be accessed by said user, said method comprising:

establishing a communication link with each of the mirror sites available;

measuring a data transfer characteristic for each of the communication links;

choosing a selected mirror site based upon results obtained from said measuring, and;

using said selected mirror site to initiate a current access to said predetermined information.

2. The method as set forth in claim 1 wherein said data transfer characteristic is measured in bytes transferred per second, said measuring including measuring time taken to transfer a predetermined number of bytes from each mirror site to said computer system.

3. The method as set forth in claim 1 wherein said data transfer characteristic is measured in bytes transferred per second, said measuring including measuring bytes transferred from each mirror site to said computer system during a predetermined maximum sample time period for each site.

4. The method as set forth in claim 2 wherein said data transfer characteristic is measured in bytes transferred per second, said measuring further including measuring bytes transferred from each mirror site to said computer system during a predetermined maximum sample time period for each site when less than said predetermined number of bytes is transferred during said maximum sample time period.

5. The method as set forth in claim 1 and further including:

providing a selection option on a display screen to the user for allowing the user to make a selection to initiate a determination of which of said mirror sites exhibits a fastest data transfer characteristic; and displaying an activation area on a display screen wherein the user may select said activation area with an input device to initiate said determination.

6. The method as set forth in claim 5 wherein said input device is a mouse device.

7. The method as set forth in claim 5 wherein said input device is a keyboard device.

8. The method as set forth in claim 6 wherein said input device includes a keyboard device in addition to said mouse device.

9. A storage medium including machine readable indicia, said storage medium being selectively coupled to a reading device, said reading device being selectively coupled to processing circuitry within a computer system, said reading device being selectively operable to read said machine readable indicia and provide program signals representative thereof, said program signals being effective to cause said computer system to selectively determine a best one of a plurality of mirror site links available for access to provide information to be downloaded by a user, wherein each of said mirror sites contains predetermined information sought to be accessed by said user, said program signals being selectively operable to accomplish the steps of:

establishing a communication link with each of the mirror sites available in response to said sample site selection;

measuring a data transfer characteristic for each of the communication links;

choosing a selected mirror site based upon results obtained from said measuring, and;

using said selected mirror site to initiate a current access to said predetermined information.

10. The storage medium as set forth in claim 9 wherein said data transfer characteristic is measured in bytes transferred per second, said measuring including measuring time taken to transfer a predetermined number of bytes from each mirror site to said computer system.

11. The storage medium as set forth in claim 9 wherein said data transfer characteristic is measured in bytes transferred per second, said measuring including measuring bytes transferred from each mirror site to said computer system during a predetermined maximum sample time period for each site.

12. The storage medium as set forth in claim 10 wherein said data transfer characteristic is measured in bytes transferred per second, said measuring further including measuring bytes transferred from each mirror site to said computer system during a predetermined maximum sample time period for each site when less than said predetermined number of bytes is transferred during said maximum sample time period.

13. The storage medium as set forth in claim 9 and further including:

providing a selection option on a display screen to the user for allowing the user to make a selection to initiate a determination of which of said mirror sites exhibits a fastest data transfer characteristic; and displaying an activation area on a display screen wherein the user may select said activation area with an input device to initiate said determination.

14. The storage medium as set forth in claim 13 wherein said input device is a mouse device.

15. The storage medium as set forth in claim 13 wherein said input device is a keyboard device.

16. The storage medium as set forth in claim 14 wherein said input device includes a keyboard device in addition to said mouse device.

17. An information processing system, said information processing system being selectively operable for selecting a best mirror site of a plurality of mirror sites available to a user of a computer system, wherein each of said mirror sites contains predetermined information sought to be accessed by said user comprising:

a processing device;

a memory unit; and a bus connecting said processing device and said memory unit, said processing device being selectively operable for executing a program from said memory for:

establishing a communication link with each of the mirror sites available in response to said sample site selection;

measuring a data transfer characteristic for each of the communication links;

choosing a selected mirror site based upon results obtained from said measuring, and;

using said selected mirror site to initiate a current access to said predetermined information.

18. The information processing system as set forth in claim 17 wherein said data transfer characteristic is measured in bytes transferred per second, said measuring including measuring time taken to transfer a predetermined number of bytes from each mirror site to said computer system.

19. The information processing system as set forth in claim 17 wherein said data transfer characteristic is measured in bytes transferred per second, said measuring including measuring bytes transferred from each mirror site to said computer system during a predetermined maximum sample time period for each site.

20. The information processing system as set forth in claim 18 wherein said data transfer characteristic is measured in bytes transferred per second, said measuring further including measuring bytes transferred from each mirror site to said computer system during a predetermined maximum sample time period for each site when less than said predetermined number of bytes is transferred during said maximum sample time period.

21. The information processing system as set forth in claim 17 and further including:

providing a selection option on a display screen to the user for allowing the user to make a selection to initiate a determination of which of said mirror sites exhibits a fastest data transfer characteristic; and displaying an activation area on a display screen wherein the user may select said activation area with an input device to initiate said determination.

22. The information processing system as set forth in claim 21 wherein said input device is a mouse device.

23. The information processing system as set forth in claim 21 wherein said input device is a keyboard device.

24. The information processing system as set forth in claim 22 wherein said input device includes a keyboard device in addition to said mouse device.

* * * * *